United States Patent
Yamada et al.

(10) Patent No.: US 9,438,160 B2
(45) Date of Patent: Sep. 6, 2016

(54) MOTOR DRIVE APPARATUS (71) Applicant: DENSO CORPORATION, Kariya, Aichi-pref. (JP)

(72) Inventors: Kouichi Yamada, Kariya (JP); Koji Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 9 days.

(21) Appl. No.: 14/418,180

(22) PCT Filed: Jul. 29, 2013

(86) PCT No.: PCT/JP2013/004575
§ 371 (c)(1),
(2) Date: Jan. 29, 2015

(87) PCT Pub. No.: WO2014/020884
PCT Pub. Date: Feb. 6, 2014

(65) Prior Publication Data
US 2015/0303859 A1 Oct. 22, 2015

(30) Foreign Application Priority Data
Jul. 31, 2012 (JP) ................. 2012-169206

(51) Int. Cl.
H02P 1/54 (2006.01)
H02P 27/08 (2006.01)
H02P 5/74 (2006.01)

(52) U.S. Cl.
CPC ............ *H02P 27/085* (2013.01); *H02P 5/74* (2013.01)

(58) Field of Classification Search
USPC ............ 318/3, 5, 7, 8, 51, 53, 625, 34, 110, 318/723, 807
See application file for complete search history.

(56) References Cited

U.S. PATENT DOCUMENTS

| 7,923,961 B2 * | 4/2011 | Takamatsu | B60L 11/18 318/599 |
| 7,928,686 B2 * | 4/2011 | Saha | H02P 6/183 180/65.285 |

(Continued)

FOREIGN PATENT DOCUMENTS

| JP | H01-321868 | 12/1989 |
| JP | H02211092 A | 8/1990 |

(Continued)

OTHER PUBLICATIONS

International Search Report and Written Opinion (in Japanese with English Translation) for PCT/JP2013/004575, mailed Oct. 15, 2013; ISA/JP.

(Continued)

*Primary Examiner* — Jorge L Carrasquillo
(74) *Attorney, Agent, or Firm* — Harness, Dickey & Pierce, P.L.C.

(57) ABSTRACT

A motor drive apparatus includes multiple inverter circuits provided corresponding, respectively, to multiple motors, a controller configured to control the inverter circuits using switching signals, a detector configured to detect a current ripple generated by switching operations of the inverter circuits. The controller operates in a first mode and a second mode. In the first mode, carrier wave frequencies of reference carrier waves used to generate the switching signals for all the motors are set to the same basic frequency. In the second mode, the carrier frequency of the motor having a higher priority is set to the basic frequency, and the carrier frequency of the motor having a lower priority is set to a preset shift frequency. When the current ripple is not less than a predetermined value, a transition occurs from the first mode to the second mode.

11 Claims, 5 Drawing Sheets

(56) References Cited

U.S. PATENT DOCUMENTS

| | | | | |
|---|---|---|---|---|
| 8,138,712 B2 * | 3/2012 | Yamada | ............... | H02M 1/12 318/400.01 |
| 2011/0080131 A1 * | 4/2011 | Shimada | ............... | H02P 27/04 318/503 |

FOREIGN PATENT DOCUMENTS

| | | | | |
|---|---|---|---|---|
| JP | H09140165 | A | | 5/1997 |
| JP | 2000092848 | A | | 3/2000 |
| JP | 2004312922 | A | | 11/2004 |
| JP | 2005176472 | A | * | 6/2005 |
| JP | 2005176472 | A | | 6/2005 |
| JP | 2006300038 | A | | 11/2006 |
| JP | 2006340536 | A | | 12/2006 |
| JP | 2009303288 | A | * | 12/2009 |
| JP | 2009303288 | A | | 12/2009 |
| JP | 2011234470 | A | | 11/2011 |
| JP | 2011259546 | A | | 12/2011 |
| JP | 2012157171 | A | * | 8/2012 |
| JP | 2012157171 | A | | 8/2012 |

OTHER PUBLICATIONS

Office Action dated Aug. 4, 2015, mailed in the corresponding JP application No. 2012-169206 with English translation.

* cited by examiner

MOTOR DRIVE APPARATUS

CROSS REFERENCE TO RELATED APPLICATIONS

This application is a U.S. National Phase Application under 35 U.S.C. 371 of International Application No. PCT/JP2013/004575 filed on Jul. 29, 2013 and published in Japanese as WO 2014/020884 A1 on Feb. 6, 2014. This application is based on and claims the benefit of priority from Japanese Patent Application No. 2012-169206 filed on Jul. 31, 2012. The entire disclosures of all of the above applications are incorporated herein by reference.

TECHNICAL FIELD

The present disclosure relates to a motor drive apparatus for driving multiple motors by electric power which is supplied from a shared power source through multiple inverter circuits.

BACKGROUND ART

A motor drive apparatus is known that converts a direct-current voltage supplied from a shared power source into alternating-current voltages using multiple inverter circuits and outputs them to multiple motors separately connected to the inverter circuits, thereby driving the motors (refer to, for example, a patent literature 1 below).

PRIOR ART LITERATURES

Patent Literature

Patent Literature 1: JP 2006-300038A

SUMMARY OF INVENTION

However, in the conventional motor drive apparatus, to reduce carrier noise (noise produced when motors and inverter circuits vibrate according to carrier wave frequencies) and switching loss, one relatively suitable frequency is used as a carrier wave frequency multiple inverter circuits use to perform PWM modulation.

When multiple motors are simultaneously driven by using the same carrier wave frequency for the motors, current ripple may increase with increase in motor load. When the current ripple is large, a capacitor factor and a coil factor of a filter circuit, for example, may be damaged, and their lives may be reduced.

In view of the above, it is an object of the present disclosure to provide a motor drive apparatus for driving multiple motors, supplied with power from a shared power source, using multiple inverter circuits while reducing current ripple.

According to an aspect of the present disclosure, the motor drive apparatus includes multiple inverter circuits provided corresponding to multiple motors supplied with electric power from a shared power source, a control means, and a physical detection means. Each inverter circuit has switching devices provided corresponding to the number of phases of a corresponding motor. The control means controls the inverter circuits by switching each switching device using a switching signal which is generated based on a result of a comparison between a reference carrier wave and a modulation wave which is an instruction to apply a voltage to each phase of the motors, so that a direct-current voltage of the shared power source is converted to an alternating-current voltage by PWM modulation and outputted to the motors. The physical quantity detection means detects current ripple generated by the switching of the inverter circuits and its related physical quantity.

The motors have preset priorities. The control means operates in a first mode and a second mode. In the first mode, all carrier frequencies of the reference carrier waves used to generate the switching signals for the motors are set to a same basic frequency. In the second mode, the carrier frequency for part of the motors having a higher priority is set to the basic frequency, and the carrier frequency for the remaining motor having a lower priority is set to a preset shift frequency different from the basic frequency. The setting is changed from the first mode to the second mode when it is determined that the current ripple is not less than a predetermined value based on a result of detection made by the physical quantity detection means.

In such an approach, if loads on multiple motors which are simultaneously driven are increased, the current ripple can be reduced compared to when the carrier frequencies for all the motors are set to the same basic frequency. Thus, even when multiple motors which are supplied with electric power from the shared power source are driven using multiple inverter circuits, the current ripple can be reduced.

BRIEF DESCRIPTION OF THE DRAWINGS

The above and other objects, features and advantages of the present disclosure will become more apparent from the following detailed description made with reference to the accompanying drawings. In the drawings.

EMBODIMENTS FOR CARRYING OUT INVENTION

Below, multiple embodiments for carrying out the present disclosure are described with reference to the drawings. Throughout the embodiments, like characters of reference indicate the same or equivalent parts in the drawings. The embodiments can be entirely or partially combined with each other unless there is a specific disadvantage in combining them.

(First Embodiment)

A first embodiment of the present disclosure is described with reference to FIG. 1 to FIG. 3.

Figure 1:
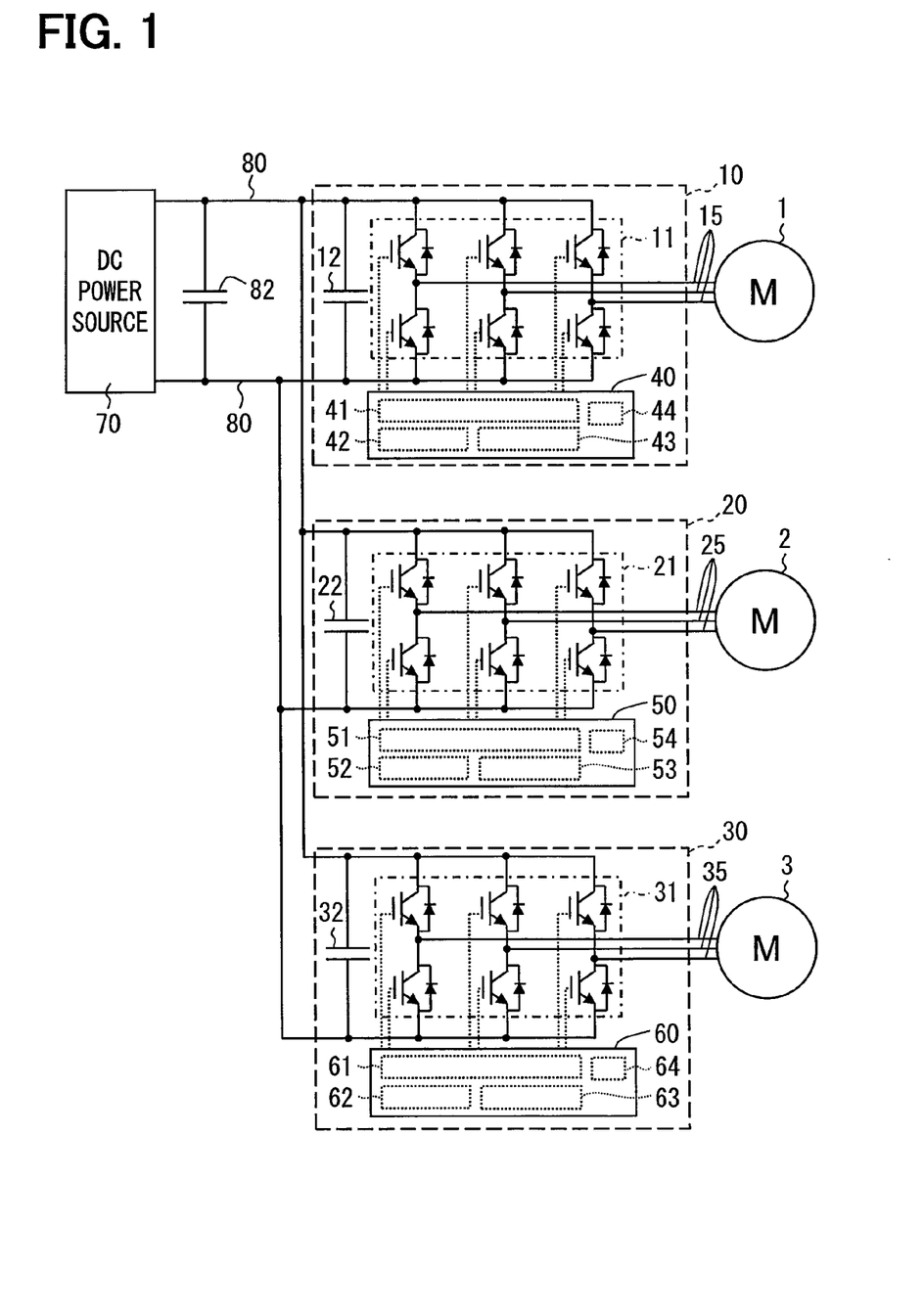
FIG. 1 is a circuit diagram partially represented as blocks of a motor drive apparatus according to a first embodiment of the present disclosure.
Figure 2:
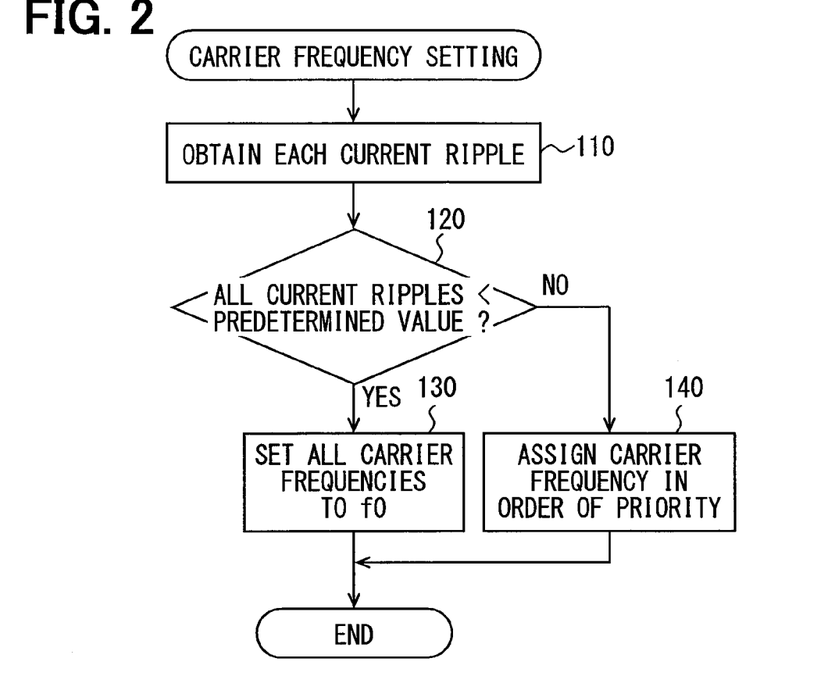
FIG. 2 is a flowchart for setting a carrier wave frequency of a control device.

As shown in FIG. 1, a motor drive apparatus according to the present embodiment is used to drive motors 1, 2, and 3 mounted on, for example, a vehicle. For example, the motor 1 is a main machine (vehicle running motor) to run the vehicle. For example, the motor 2 is a motor to drive a compression mechanism of an electric compressor which is not omitted in the drawing.

For example, the electric compressor is placed in a heat pump cycle of a vehicle air conditioner, which uses carbon dioxide as a coolant, and drives the compression mechanism as a load by the incorporated motor 2. The electric compressor compresses (for example, in the case of the carbon dioxide, compresses it to or above its critical pressure) and discharges gas-phase coolant.

For example, the motor 3 is a fan motor and rotates a blower fan placed in an air duct of a vehicle air conditioner so that conditioned air can be blown into a vehicle interior. Although not shown in the drawing, an evaporator forming a refrigeration cycle equipment with the electric compressor is placed in the air duct, where the blower fan driven by the motor 3 is placed, and located on the downstream side of the blower fan so that the air to be blown can be cooled.

According to the present embodiment, for example, each of the motors 1, 2, and 3 is a four pole, three-phase synchronous motor in which a rotor with an embedded magnet is driven and rotated by coils.

For example, a direct-current power source 70 shown in FIG. 1 is a high-voltage battery capable of outputting a voltage of 288 V. The direct-current power source 70 supplies electric power to drivers 10, 20, and 30 for the corresponding motors through a pair of bus serving as a power supply path. The drivers 10, 20, and 30 are connected in parallel to the direct-current power source 70.

The driver 10 for the motor 1 as a main machine is a main drive apparatus out of motor drive apparatuses supped with electric power from the direct-current power source 70. In contrast, the drivers 20 and 30 for the motors 2 and 3 as auxiliary machines are secondary drive apparatuses. It is noted that electric power inputted from the direct-current power source 70 to the main drive apparatus is greater than that to the secondary drive apparatus. For example, electric power inputted to the driver 10 is one digit or more (ten times or more) greater than electric power inputted to the drivers 20 and 30. When it is difficult to supply electric power to all the drive apparatuses, the main drive apparatus may be preferentially supplied with electric power.

The driver 10 includes an inverter circuit 11, a capacitor 12, and a controller 40 as a control means.

Depending on a stator coil of the motor 1, the inverter circuit 11 has, for example, three phase arms: a U-phase arm, a V-phase arm, and a W-phase arm called from the left in the drawing. The inverter circuit 11 converts a direct-current voltage, inputted through the bus wires, to an alternating-current voltage by PWM modulation and outputs it.

The U-phase arm includes an upper arm on the upper side in the drawing and a lower arm on the lower side in the drawing. The upper arm has a switching device and a flyback diode which are connected in antiparallel to each other. Likewise, the lower arm has a switching device and a flyback diode which are connected in antiparallel to each other. An output wire 15 connected to a node between the upper arm and the lower arm is connected to a coil of the motor.

Like the driver 10, the driver 20 includes an inverter circuit 21, a capacitor 22, and a controller 50 as a control means. Further, like the driver 10, the driver 30 includes an inverter circuit 31, a capacitor 32, and a controller 60 as a control means. For example, each of the inverter circuits 21 and 31 has the same structure as the inverter circuit 11, and their output wires 25 and 35 are connected to coils of the motors 2 and 3, respectively.

For example, the switching device of each of the inverter circuits 11, 21, and 31 can be an insulated gate bipolar transistor (IGBT). The arm constructed with the switching device and the diode can be a switching device such as a reverse conducting insulated gate bipolar transistor (RCIGBT) which is a power semiconductor fabricated by integrating an IGBT and a flyback diode into one chip.

The capacitors 12, 22, and 32 and a capacitor 82 as a smoothing means are connected between the pair of bus wires 80. The capacitor 82 is a high-voltage smoothing capacitor for reducing fluctuations in a power supply voltage of the direct-current power source 70. The capacitors 12, 22, and 32 absorb surges and ripples which occur when the switching devices of the inverter circuits 11, 21, and 31 are switched ON and OFF.

The controller 40 controls a switching of each switching device of the inverter circuit 11, thereby controlling a rotation of the motor 1. The controller 40 receives motor rotation speed command information and motor coil current information detected by a current detector which is omitted in the drawing, generates a notch wave (pulse wave) as a switching signal based on the information, and outputs the switching signal to the inverter circuit 11.

The controller 40 includes a PWM control means 41, a frequency generating means 42, a carrier frequency setting means 43, and a current ripple estimating means 44.

For example, the PWM control means 41 is implemented by a microcomputer, generates a switching signal to switch the switching device of each of the phase arms based on a comparison between a modulation wave as a command to apply a voltage to the coil of the motor 1 and a reference carrier wave (sometimes referred to as the carrier or carrier wave), and outputs the switching signal to each arm, thereby controlling the switching of the switching device.

For example, the frequency generating means 42 is what is called a clock having an oscillator and generates a basic control frequency in the controller 40. The carrier frequency setting means 43 generates and sets a carrier wave frequency (sometimes referred to as the carrier frequency), which is used by the PWM control means 41 when generating the switching signal, based on the basic control frequency generated by the frequency generating means 42.

For example, the current ripple estimating means 44 receives motor load information (input current, output current, rotation speed, etc) and estimates/calculates current ripple flowing into a circuit provided with the capacitor 12. The current ripple estimating means 44 outputs the calculated current ripple to the carrier frequency setting means 43.

In general, there is a correlation between a current ripple and a motor load condition. For example, the current ripple estimating means 44 stores mapping data having current ripples corresponding to three motor load conditions and calculates the current ripple based on the inputted load information.

In this way, since the current ripple estimating means 44 estimates/calculates the current ripple based on the motor load information, a structure for obtaining the current ripple can be simplified. Alternatively, for example, as shown in FIG. 3, the current ripple estimating means can be replaced with a current detector 90 as a current ripple detecting means for directly detecting the current ripple.

For example, the current detector 90 can include a resistor 91 and a microcomputer 92. The resistor 91 is connected in series to the capacitor 12. The microcomputer 92 serves as a converting means for detecting a voltage across the resistor 91 and for converting it into a current value. Alternatively, the current ripple detecting means for detecting the current can be a current sensor connected in series to the capacitor 12. Thus, the current ripple can be accurately obtained by the current ripple detecting means.

The controller 50 controls a switching of each switching device of the inverter circuit 21, thereby controlling a rotation of the motor 2. The controller 50 receives motor rotation speed command information and motor coil current information detected by a current detector which is omitted in the drawing, generates a switching signal based on the information, and outputs the switching signal to the inverter circuit 21.

The controller 60 controls a switching of each switching device of the inverter circuit 31, thereby controlling a rotation of the motor 3. The controller 60 receives motor rotation speed command information and motor coil current information detected by a current detector which is omitted in the drawing, generates a switching signal based on the information, and outputs the switching signal to the inverter circuit 31.

Like the controller 40, the controllers 50 and 60 have PWM control means 51 and 61, frequency generating means 52 and 62, carrier frequency setting means 53 and 63, and current ripple estimating means 54 and 64, respectively. Each means of each of the controllers 50 and 60 has the same function as a corresponding means of the controller 40.

Figure 3:
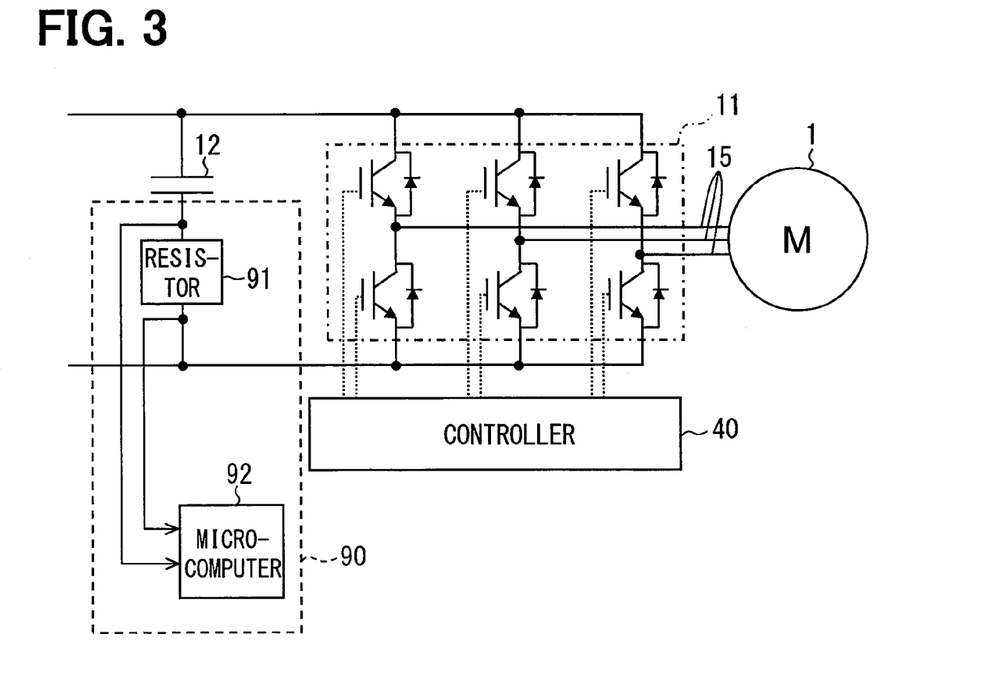
FIG. 3 is a circuit diagram partially represented as blocks of a current ripple detection means.

Even in the controllers 50 and 60, the current ripple estimation means can be replaced with a current ripple detection means having the same structure as the current detector 90 shown in FIG. 3 and directly detecting the current ripple. Each of the current ripple estimating means 44, 54, and 64 and the current ripple detecting means corresponds to a physical quantity detecting means for detecting a current ripple or its related physical quantity.

It is noted that the current ripple estimating means 44, 54, 64 work in conjunction with each other to estimate/calculate or at least one of them estimates/calculates a current ripple flowing into a circuit provided with the capacitor 82. Alternatively, the current ripple flowing into the circuit provided with the capacitor 82 can be directly detected by using a current ripple detecting means instead of estimation/calculation.

The controllers 40, 50, and 60 generate the switching signals in the PWM control means 41, 51, and 61 using the reference carrier waves having the carrier frequencies set by the carrier frequency setting means 43, 53, and 63 and outputs the generated switching signals to each phase arm of the inverter circuits 11, 21, and 31, respectively. For example, each of the controllers 40, 50, and 60 outputs the switching signal for every one PWM period at an interval of 50 μs.

When the controllers 40, 50, and 60 repeatedly output the switching signals to the inverter circuits 11, 21, and 31 as described above, the carrier frequency setting means 43, 53, and 63 repeatedly perform a carrier frequency setting control for working in conjunction with each other to set the carrier frequencies.

Next, a control operation performed by the carrier frequency setting means 43, 53, and 63 to set the carrier frequency is described with reference to FIG. 2.

Firstly, the carrier frequency setting means 43, 53, and 63 obtain the current ripples flowing into the circuits provided with the capacitors 12, 22, 32, and 82 from the current ripple estimating means 44, 54, and 64 (step 110). Alternatively, as mentioned previously, the current ripples directly detected by the current ripple detecting means can be obtained at this step.

As an initial setting, when the step 110 is performed for the first time, all carrier frequencies of reference carrier waves used in the PWM control means 41, 51, and 61 are set to a basic frequency f0 (e.g., 20 kHz) in consideration of carrier noise and heat generation due to switching loss. According to the present embodiment, a mode where all the carrier frequencies for multiple motors 1, 2, and 3 are set to the same basic frequency f0 is a first mode.

After each current ripple is obtained, it is determined whether all the current ripples are less than predetermined values (step 120). The predetermined values to be compared with the current ripples can be the maximum allowable value which is determined by characteristics of each component of each driver and system characteristics of the driver.

The characteristics by which the predetermined values are determined can be characteristics of each capacitor as a capacitor component, characteristics of a conductor of the circuit having the capacitor (e.g., a coil component formed depending on the length and shape of the bus wires 80 connecting the inverter circuits and the capacitors), and a frequency of occurrence of a high current ripple when all the carrier frequencies are set to the basic frequency. If a discrete coil is connected to the circuit, the predetermined values are determined I in consideration of characteristics of the coil.

If it is determined that all the current ripples are less than the predetermined values at step 120, all the carrier frequencies of the reference carrier waves used in the PWM control means 41, 51, and 61 are set to the basic frequency f0 (step 130).

In contrast, if it is not determined that all the current ripples are less than the predetermined values, i.e., if at least one of the current ripples is not less than the corresponding predetermined value, the carrier frequencies of the reference carrier waves used in the PWM control means 41, 51, and 61 are set to the basic frequency f0, a shift frequency f1 (e.g., 18 kHz), and a shift frequency f2 (e.g., 16 kHz) (step 140). The shift frequencies f1 and f2 are close to the basic frequency f0.

At step 140, the frequencies f0, f1, and f2 are assigned in descending order of priorities preset to the motors. The priorities of the motors are preset based on characteristics related to operating conditions of the motors including their required quietness (required noise reduction) and their output.

According to the first embodiment, the motor 1, the motor 2, and the motor 3 are prioritized in this order in view of their required quietness. Therefore, the carrier frequency of the reference carrier wave used in the PWM control means 41 is set to the basic frequency f0. The carrier frequency of the reference carrier wave used in the PWM control means 51 is set to the shift frequency f1, and the carrier frequency of the reference carrier wave used in the PWM control means 61 is set to the shift frequency f2.

According to the present embodiment, a mode where the carrier frequency for the motor 1 having a higher priority is set to the basic frequency f0, and the carrier frequencies for the motors 2 and 3 having a lower priority are set to the shift frequencies f1 and f2 is a second mode.

According to the above structure and operations, the carrier frequency setting means 43, 53, and 63 of the controllers 40, 50, and 60 can change the setting between the first mode, where all the carrier frequencies for multiple motors 1, 2, and 3 are set to the same basic frequency f0, and the second mode, where the carrier frequency for the motor 1 having a higher priority is set to the basic frequency f0, and the carrier frequencies for the remaining motors 2 and 3 having a lower priority are set to the shift frequencies f1 and f2 different from the basic frequency f0.

In the first mode, if it is determined that any of the current ripples is not less than the corresponding predetermined value based on the results of calculations made by the current ripple estimating means 44, 54, and 64, the setting is changed to the second mode.

Thus, when any of the current ripples is not less than the corresponding predetermined value, the controllers 40, 50, and 60 uses the second mode so that the carrier frequency for the motor 1 having a higher priority is set to the basic frequency f0, and the carrier frequencies for the remaining motors 2 and 3 having a lower priority are set to the shift frequencies f1 and f2 different from the basic frequency f0.

In such an approach, if loads on multiple motors 1, 2, and 3 which are simultaneously driven are increased, the current ripple can be reduced compared to when all the carrier frequencies for multiple motors 1, 2, and 3 are set to the same basic frequency f0. Thus, even when multiple motors 1, 2, and 3, which are supplied with electric power from the shared DC power source 70, are driven using multiple inverter circuits 11, 21, and 31, the current ripple can be reduced.

Since the current ripple flowing into the circuit provided with the capacitor component is reduced, damage to the coil component forming the circuit with the capacitor component can be reduced.

In other words, since the current ripple flowing into a filter circuit provided in a power supply path from the DC power source 70 to each of the inverter circuits 11, 21, and 31 is reduced, damage to the capacitor component and the coil component of the filter circuit can be reduced.

Further, according to the present embodiment, in the second mode 2, the number of the remaining motors 2 and 3 is not one. In such a case, the controllers 40, 50, and 60 cause the shift frequencies f1 and f2 for the remaining motors 2 and 3 to be different from each other in such a manner that the shift frequency f1 for the motor 2 having a higher priority is closer to the basic frequency f0 than the shift frequency f2 for the motor 3 having a lower priority.

Thus, when using the second mode so that the carrier frequencies for multiple remaining motors 2 and 3 are set to the shift frequencies, the controllers 40, 50, and 60 cause the shift frequencies f1 and f2 to be different from each other in such a manner that the shift frequency for the motor 2 having a higher priority is closer to the basic frequency f0. In such an approach, the current ripple can be surely reduced while changing little driving conditions of the motor 2 having a higher priority (while keeping the driving conditions good).

The carrier frequencies f0, f1, and f2 assigned to the motors 1, 2, and 3 are different from each other. That is, the basic frequency f0 is assigned to only the motor 1. Thus, the current ripple can be more surely reduced.

According to the present embodiment, multiple motors 1, 2, and 3 are mounted on a vehicle, and the drivers 10, 20, and 30 are integrally arranged with the motors 1, 2, and 3, respectively. In this case, the drivers 10, 20, and 30 are relatively distanced from each other. In such an arrangement, it is difficult to reduce the current ripples by bringing the reference carrier waves of multiple divers 10, 20, and 30 into sync with each other while reversing the phases (shifting the phases by 180°). For this reason, when the drivers 10, 20, and 30 are distanced from each other, the present disclosure is very effective.

Further, when multiple drivers are mounted on a mobile object such as a vehicle, there is a great need for miniaturization of the system and each component compared to when they are installed in a stationary manner inside or outside of a building. Therefore, it is difficult to improve resistance against high current ripples by increasing the size of the capacitor and also difficult to deal with the current ripples by adding a voltage converter or the like. The present disclosure is very effective even under these constraints.

Further, when the voltage of the DC power source is high (e.g., several hundred volts), the capacitor needs to have a large size compared to when it is low. Therefore, as described in the present embodiment, an increase in the size of the capacitor or the like in a high-voltage system can be reduced very effectively.

(Second Embodiment)

Figure 4:
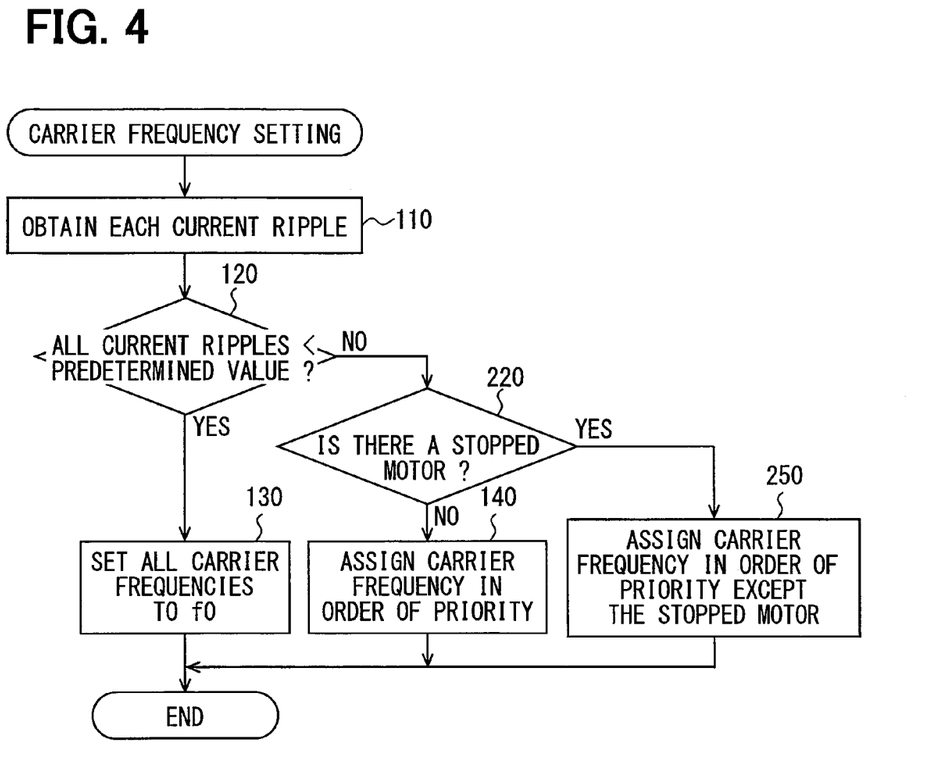
FIG. 4 is a flowchart for setting a carrier wave frequency of a control device according to a second embodiment.

Next, a second embodiment is described below with reference to FIG. 4.

The second embodiment differs from the first embodiment in that the carrier frequencies are assigned in consideration of whether the motors are operating. It is noted that a structure having the same character as that in the drawings of the first embodiment and a structure whose description is omitted in the second embodiment have the same effect and advantage as those in the first embodiment.

In a motor drive apparatus according to the present embodiment, when it is not determined at step 120 that all the current ripples are less than the predetermined values, i.e., at least one of the current ripples is not less than the corresponding predetermined value, the carrier frequency setting means 43, 53, and 63 of the controllers 40, 50, and 60 determine whether there is a stopped motor which stops operating (step 220).

If it is determined at step 220 that there is no stopped motor, it proceeds to step 140. At step 140, for example, the basic frequency f0 is assigned to the carrier frequency of the motor 1 (the PWM control means 41), the shift frequency f1 is assigned to the carrier frequency of the motor 2 (the PWM control means 51), and the shift frequency f2 is assigned to the carrier frequency of the motor 3 (the PWM control means 61).

If it is determined at step 220 that there is a stopped motor, the stopped motor is excluded from the priorities of the motors. Then, the basic frequency and the shift frequency are assigned to the carrier frequencies in order of the priorities except the stopped motor (step 250).

At step 250, for example, when the motor 1 is stopped, the basic frequency f0 is assigned to the carrier frequency of the motor 2 (the PWM control means 51), and the shift frequency f1 is assigned to the carrier frequency of the motor 3 (the PWM control means 61).

According to the present embodiment, the same effects as obtained in the first embodiment can be obtained.

Further, when there is a motor which stops operating (the motor 1 in the present example), the controllers 40, 50, and 60 exclude this motor from the priorities of multiple motors 1, 2, and 3.

In such an approach, there is no need to assign a carrier frequency to the stopped motor 1. Thus, when the second mode is used, the basic frequency f0 and the shift frequency f1 relatively close to the basic frequency can be assigned to the motors 2 and 3 having priorities lower than that of the stopped motor 1.

Thus, for example, the relatively suitable basic frequency f0 and the shift frequency f1 relatively close to the basic frequency f0 can be used for the PWM modulation instead of the shift frequency f2. That is, the driving conditions of the operating motors can be kept good.

In the above explanation, the motor 1 stops operating. However, when the electric compressor is not used, for example, in certain seasons such as spring and fall, the motor 2 stops operating. In this case, for example, at step 250, the basic frequency f0 is assigned to the carrier frequency of the motor 1 (the PWM control means 41), and the shift frequency f1 is assigned to the carrier frequency of the motor 3 (the PWM control means 61). Further, when the motor 1 as a running motor also stops operating, the basic frequency f0 is assigned to the carrier frequency of the motor 3 (the PWM control means 61).

(Third Embodiment)

Figure 5:
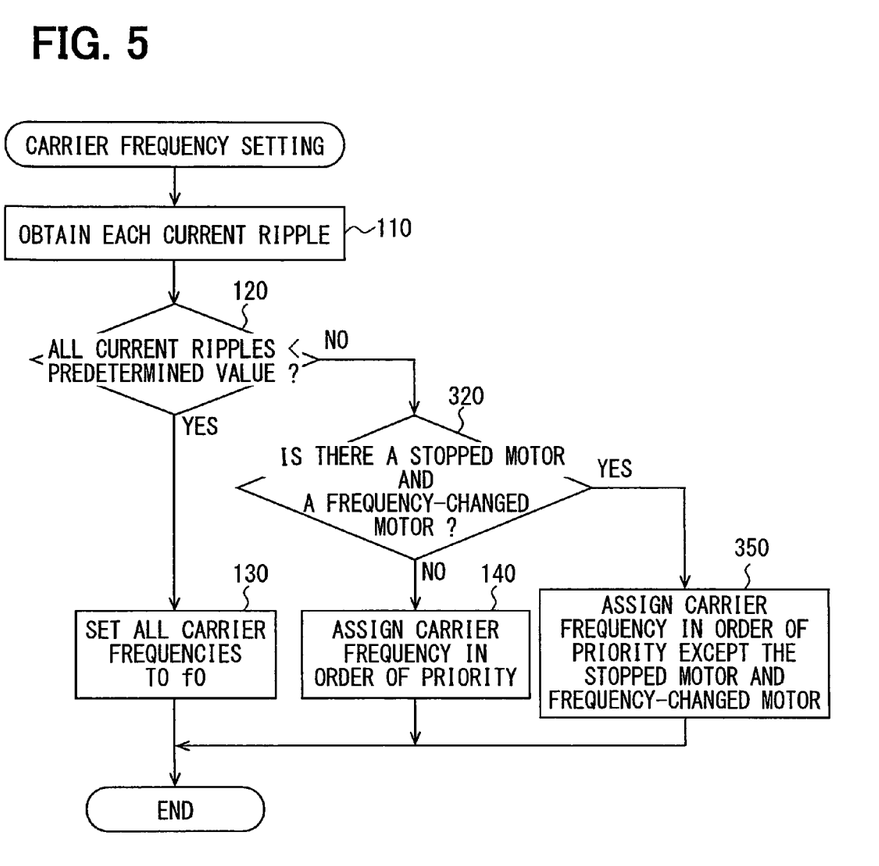
FIG. 5 is a flowchart for setting a carrier wave frequency of a control device according to a third embodiment.

Next, a third embodiment is described below with reference to FIG. 5.

The third embodiment differs from the second embodiment in that the carrier frequencies are assigned in consideration of a case where the carrier frequency has been already changed from the basic frequency due to another factor. It is noted that a structure having the same character as that in the drawings of the first and second embodiments and a structure whose description is omitted in the third embodiment have the same effect and advantage as those in the first and second embodiments.

In a motor drive apparatus according to the present embodiment, when it is not determined at step 120 that all the current ripples are less than the predetermined values, the carrier frequency setting means 43, 53, and 63 of the controllers 40, 50, and 60 determine whether there are a stopped motor and a motor whose carrier frequency has been already changed from the basic frequency f0 due to a factor other than the current ripple (step 320).

For example, when the motor 1 is heated to a relatively high temperature due to high load, the carrier frequency may be reduced from the basic frequency f0 to fa (e.g., 5 kHz) so that heat generation can be reduced. This is an example of the case where the carrier frequency has been already changed due to a factor other than the current ripple.

If it is determined at step 320 that there is no stopped motor and no motor whose carrier frequency has been already changed, it proceeds to step 140. At step 140, for example, the basic frequency f0 is assigned to the carrier frequency of the motor 1 (the PWM control means 41), the shift frequency f1 is assigned to the carrier frequency of the motor 2 (the PWM control means 51), and the shift frequency f2 is assigned to the carrier frequency of the motor 3 (the PWM control means 61).

If it is determined at step 320 that there is a stopped motor and a motor whose carrier frequency has been already changed, the stopped motor and the motor whose carrier frequency has been already changed are excluded from the priorities of the motors. Then, the basic frequency and the shift frequency are assigned to the carrier frequencies in order of the priorities except the stopped motor and the motor whose carrier frequency has been already changed (step 350).

At step 350, for example, when there is no stopped motor, and the carrier frequency fa different from the basic frequency has been already assigned to the motor 1 like in the example described, the basic frequency f0 is assigned to the carrier frequency of the motor 2 (the PWM control means 51), and the shift frequency f1 is assigned to the carrier frequency of the motor 3 (the PWM control means 61).

Further, for example, when the motor 1 stops operating, and the carrier frequency fa different from the basic frequency has been already assigned to the motor 2 (the PWM control means 51), the basic frequency f0 is assigned to the carrier frequency of the motor 3 (the PWM control means 61).

According to the present embodiment, the same effects as obtained in the second embodiment can be obtained.

Further, the controllers 40, 50, and 60 can use a third mode where the frequency fa different from the basic frequency f0 is set to the carrier frequency of part of multiple motors 1, 2, and 3 regardless of the results of the calculations made by the current ripple estimating means 44, 54, and 64 (regardless of values of the current ripples).

In the third mode, when it is determined that any of the current ripples is not less than the corresponding predetermined value based on the results of calculations made by the current ripple estimating means 44, 54, and 64, the setting is changed to the second mode.

When the setting is changed to the second mode, the motor using the frequency fa is excluded from the priorities of multiple motors.

In such an approach, there is no need to assign a carrier frequency to the motor having the carrier frequency to which the frequency fa different from the basic frequency f0 has been already assigned for a purpose other than to reduce the current ripple. Thus, in the second mode, the basic frequency f0 and the shift frequency f1 relatively close to the basic frequency f0 can be assigned to the motors having priorities lower than that of the motor to which the frequency fa has been already assigned.

Thus, for example, the relatively suitable basic frequency f0 and the shift frequency f1 relatively close to the basic frequency f0 can be surely used for the PWM modulation instead of the shift frequency f2. That is, the driving conditions of the operating motors except the motor to which the frequency fa has been already assigned for a purpose other than to reduce the current ripple can be kept good.

(Fourth Embodiment)

Figure 6:
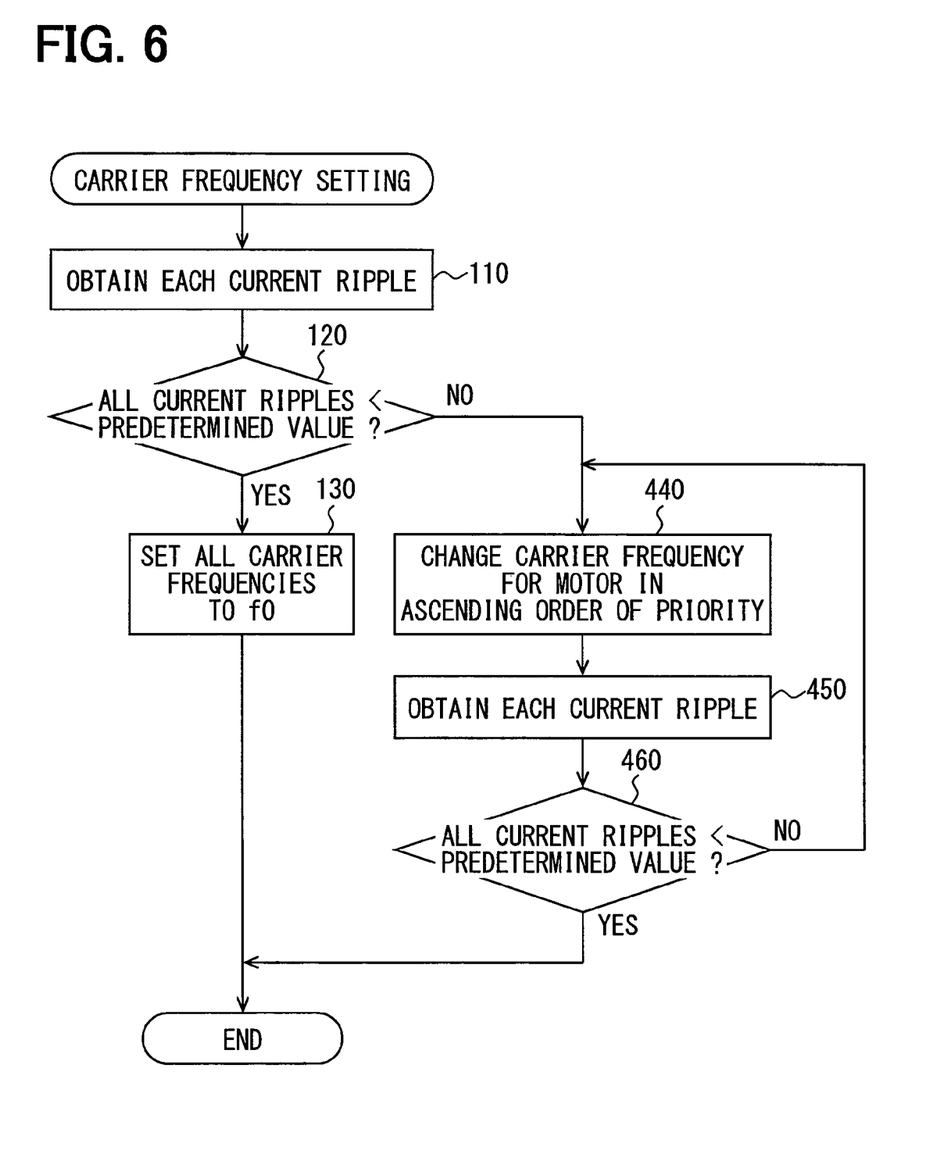
FIG. 6 is a flowchart for setting a carrier wave frequency of a control device according to a fourth embodiment.

Next, a fourth embodiment is described below with reference to FIG. 6.

The fourth embodiment differs from the first embodiment in that the number of the motors whose carrier frequencies are changed from the basic frequency to the shift frequency is made as small as possible. It is noted that a structure having the same character as that in the drawings of the first embodiment and a structure whose description is omitted in the fourth embodiment have the same effect and advantage as those in the first embodiment.

In a motor drive apparatus according to the present embodiment, when it is not determined at step 120 that all the current ripples are less than the predetermined values, the carrier frequency setting means 43, 53, and 63 of the controllers 40, 50, and 60 change the carrier frequency of the motor having a lower priority from the basic frequency to the shift frequency (step 440).

When step 440 is performed for the first time, a shift frequency closest to the basic frequency is assigned to the carrier frequency of the motor having a lowest priority, and the carrier frequencies of the other motors are kept unchanged at the basic frequency.

For example, at step 440 performed for the first time, the basic frequency f0 is assigned to both the carrier frequency of the motor 1 (the PWM control means 41) and the carrier frequency of the motor 2 (the PWM control means 51), and the shift frequency f1 is assigned to the carrier frequency of the motor 3 (the PWM control means 61).

After step 440, the current ripples calculated by using the carrier frequencies assigned at step 440 are obtained from the current ripple estimating means 44, 54, and 64 (step 450). If the current ripple detection means are used instead of the current ripple estimation means, the directly detected current ripples are obtained here.

When the current ripples are obtained at step 450, it is determined like at step 120 whether all the current ripples are less than the predetermined values (step 460).

If it is determined at step 460 that all the current ripples are less than the predetermined values, it ends. That is, the carrier frequencies of the reference carrier waves used in the PWM control means 41, 51, and 61 are set to the frequencies assigned at the latest step 440.

In contrast, if it is not determined at step 460 that all the current ripples are less than the predetermined values, i.e., at least one of the current ripples is not less than the corresponding predetermined value, it returns to step 440 so that steps 440-460 can be performed again.

At step 440 performed for the second or more time, the shift frequency is assigned up to the motor having a priority higher than that of the most highly prioritized motor to which the shift frequency is assigned at the previous step 440.

For example, as described above, if the basic frequency f0 is assigned to both the carrier frequency of the motor 1 and the carrier frequency of the motor 2, and the shift frequency f1 is assigned to the carrier frequency of the motor 3 at step 440 performed for the first time, the carrier frequencies are assigned at step 440 performed for the second time as follows.

At step 440 performed for the second time, the basic frequency f0 is assigned to the carrier frequency of the motor 1, the shift frequency f1 is assigned to the carrier frequency of the motor 2, and the shift frequency f2 is assigned to the carrier frequency of the motor 3. In other word, a target to be assigned the shift frequency f1 is moved up from the motor 3 to the motor 2, and the motor 3 is assigned the shift frequency f2 instead.

Thus, each time step 40 is repeated, the shift frequency is sequentially assigned to the motor having a lower priority.

According to the present embodiment, almost the same effects as obtained in the first embodiment can be obtained.

In addition, when the setting is changed to the second mode, the controllers 40, 50, and 60 sequentially assign the shift frequency to the motor having a lower priority until they determine that all the current ripples become less than the predetermined values based on the results of the calculations made by the current ripple estimating means 44, 54, and 64. Then, when the controllers 40, 50, and 60 determine that all the current ripples become less than the predetermined values based on the results of the calculations made by the current ripple estimating means 44, 54, and 64, they stops the sequential assignment of the shift frequency so that the carrier frequency settings can be kept unchanged.

In such an approach, it is possible to prevent the number of the motors to which the shift frequency is assigned from being increased unnecessarily. Thus, the current ripples can be more surely reduced while keeping the number of the motors whose driving conditions are changed (in a way to deteriorate the driving conditions) as small as possible.

Even in the present embodiment, like in the second embodiment and the third embodiment, the stopped motor and the motor whose carrier frequency has been already changed due to a factor other than the current ripple can be excluded from the priorities of multiple motors.

(Modification)

While the present disclosure has been described with reference to the embodiments, it is to be understood that the disclosure is not limited to the embodiments. The present disclosure is intended to cover various modifications and equivalent arrangements within the spirit and scope of the present disclosure. For example, the embodiments can be modified as follows.

In the embodiments, the motor drive apparatus drives and controls three motors. However, the number of the motors is not limited to this and can be two or four or more. When the motor drive apparatus is designed to be mounted on a vehicle, the motors can include a radiator fan motor, a water pump motor, an oil pump motor, and an electric steering motor besides those described in the embodiments.

In the second mode according to the first to third embodiments, although the carrier frequencies f0, f1, and f2 which are different from each other are assigned to the motors 1, 2, and 3, the assignment is not limited to this. When the carrier frequencies assigned in the second mode according to the first embodiment are represented as (f0, f1, f2) by arranging them in parentheses in descending order of the priorities of the motors, the assignment is not limited to this. For example, the assignment can be (f0, f1, f1).

Further, when there are four motors, the assignment is not limited to (f0, f1, f2, f3) but can include (f0, f0, f1, f1), (f0, f1, f1, f1), and (f0, f1, f1, f2), so that part of the motors can be assigned the same carrier frequency.

Further, in the fourth embodiment, when the setting is changed from the first mode setting (f0, f0, f0) to the second mode, the carrier frequency is changed as follows: (f0, f0, f1)->(f0, f1, f2) until all the current ripples become less than the predetermined values. However, it is not always necessary to do this, and the same carrier frequency can be used for some. For example, it can be changed from (f0, f0, f0) as follow: (f0, f0, f1)->(f0, f1, f1). For example, when the number of the motors is four, the carrier frequency can be changed from (f0, f0, f0, f0) as follow: (f0, f0, f0, f1)->(f0, f0, f1, f1).

In the embodiments, the controllers 40, 50, and 60 are integrally arranged with the motors 1, 2, and 3, respectively. However, it is not limited to this. For example, switching actions of multiple inverter circuits can be controlled by one controller. Further, it is not always necessary that the inverter circuits are integrally arranged with the respective motors. For example, an integrated inverter circuit in which multiple inverter circuits share at least part of wirings can be employed.

Further, although all the motors 1, 2, and 3 are three-phase motors in the embodiments, it is not limited to this. For example, they can be four-or-more phase motors.

Further, although multiple motors and a motor drive apparatus for driving these are mounted on a vehicle in the embodiments, it is not limited to this. Multiple motors and a motor drive apparatus for driving these can be mounted on a mobile object other than a vehicle and also can be used in a stationary manner.

What is claimed is:

1. A motor drive apparatus comprising:
a plurality of inverter circuits, each inverter circuit having switching devices provided corresponding to the number of phases of each of a plurality of motors supplied with electric power from a shared power source;
a controller configured to control the plurality of inverter circuits by switching each switching device using a switching signal which is generated based on a result of a comparison between a reference carrier wave and a modulation wave which is an instruction to apply a voltage to each phase of the plurality of motors, so that a direct-current voltage of the shared power source is converted to an alternating-current voltage by PWM modulation and outputted to the plurality of motors, and
a physical quantity detector configured to detect current ripple generated by the switching of the plurality of inverter circuits and its related physical quantity, wherein
the plurality of motors have preset priorities, the controller is capable of changing a setting between a first mode and a second mode, in the first mode, all carrier frequencies of the reference carrier waves used to generate the switching signals for the plurality of motors are set to a same basic frequency, in the second mode, the carrier frequency for part of the motors having a higher priority is set to the basic frequency, and the carrier frequency for the remaining motor having a lower priority is set to a shift frequency different from the basic frequency, the controller changes the setting from the first mode to the second mode when determining that the current ripple is not less than a predetermined value based on a result of detection made by the physical quantity detector; wherein when changing the setting to the second mode, the controller sequentially assigns the shift frequency to the motor having a lower priority until determining that the current ripple becomes less than the predetermined value based on the result of detection made by the physical quantity detector, and the controller stops the sequential assignment when determining that the current ripple becomes less than the predetermined value based on the result of detection made by the physical quantity detector.

2. The motor drive apparatus according to claim 1, wherein in the second mode, when the number of the remaining motors is not one, the controller causes the shift frequencies for the remaining motors to be different from each other in such a manner that the shift frequency for the remaining motor having a higher priority is closer to the basic frequency than the shift frequency for the remaining motor having a lower priority.

3. The motor drive apparatus according to claim 1, wherein when at least one of the plurality of motors stops operating, the controller excludes the stopped motor from the priorities of the plurality of motors.

4. The motor drive apparatus according to claim 1, wherein the controller is capable of changing the setting to a third mode where a frequency different from the basic frequency is set to the carrier frequency of part of the plurality of motors regardless of the result of detection made by the physical quantity detector, the controller changes the setting from the third mode to the second mode, when determining that the current ripple is not less than the predetermined value based on the result of detection made by the physical quantity detector, and when changing the setting to the second mode, the controller excludes the motor using the different frequency from the priorities of the plurality of motors.

5. The motor drive apparatus according to claim 1, wherein the plurality of motors are mounted on a vehicle, and each inverter circuit and a corresponding motor are integrally arranged so that the plurality of inverter circuits are distanced from each other.

6. The motor drive apparatus according to claim 1, wherein the plurality of motors are mounted on a vehicle, the controller is one of a plurality of controllers provided corresponding to the plurality of motors, and each controller and a corresponding motor are integrally arranged so that the plurality of controllers are distanced from each other.

7. A motor drive apparatus comprising:

a plurality of inverter circuits, each inverter circuit having switching devices provided corresponding to the number of phases of each of a plurality of motors supplied with electric power from a shared power source;

a controller configured to control the plurality of inverter circuits by switching each switching device using a switching signal which is generated based on a result of a comparison between a reference carrier wave and a modulation wave which is an instruction to apply a voltage to each phase of the plurality of motors, so that a direct-current voltage of the shared power source is converted to an alternating-current voltage by PWM modulation and outputted to the plurality of motors, and a physical quantity detector configured to detect current ripple generated by the switching of the plurality of inverter circuits and its related physical quantity, wherein the plurality of motors have preset priorities, the controller is capable of changing a setting between a first mode and a second mode, in the first mode, all carrier frequencies of the reference carrier waves used to generate the switching signals for the plurality of motors are set to a same basic frequency, in the second mode, the carrier frequency for part of the motors having a higher priority is set to the basic frequency, and the carrier frequency for the remaining motor having a lower priority is set to a shift frequency different from the basic frequency, and the controller changes the setting from the first mode to the second mode when determining that the current ripple is not less than a predetermined value based on a result of detection made by the physical quantity detector; wherein the controller is capable of changing the setting to a third mode where a frequency different from the basic frequency is set to the carrier frequency of part of the plurality of motors regardless of the result of detection made by the physical quantity detector, the controller changes the setting from the third mode to the second mode, when determining that the current ripple is not less than the predetermined value based on the result of detection made by the physical quantity detector, and when changing the setting to the second mode, the controller excludes the motor using the different frequency from the priorities of the plurality of motors.

8. The motor drive apparatus according to claim 7, wherein in the second mode, when the number of the remaining motors is not one, the controller causes the shift frequencies for the remaining motors to be different from each other in such a manner that the shift frequency for the remaining motor having a higher priority is closer to the basic frequency than the shift frequency for the remaining motor having a lower priority.

9. The motor drive apparatus according to claim 7, wherein when at least one of the plurality of motors stops operating, the controller excludes the stopped motor from the priorities of the plurality of motors.

10. The motor drive apparatus according to claim 7, wherein
   the plurality of motors are mounted on a vehicle, and
   each inverter circuit and a corresponding motor are integrally arranged so that the plurality of inverter circuits are distanced from each other.

11. The motor drive apparatus according to claim 7, wherein
   the plurality of motors are mounted on a vehicle,
   the controller is one of a plurality of controllers provided corresponding to the plurality of motors, and
   each controller and a corresponding motor are integrally arranged so that the plurality of controllers are distanced from each other.

* * * * *